(12) United States Patent
Wang et al.

(10) Patent No.: US 11,509,888 B1
(45) Date of Patent: Nov. 22, 2022

(54) METHOD FOR ALIGNING CAMERA LENS WITH LIGHT SOURCE

(71) Applicant: PRIMAX ELECTRONICS LTD., Taipei (TW)

(72) Inventors: Hsiu-Wen Wang, Taipei (TW); Chih-Wen Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 7 days.

(21) Appl. No.: 17/383,471

(22) Filed: Jul. 23, 2021

(30) Foreign Application Priority Data

May 24, 2021 (TW) .................................. 110118692

(51) Int. Cl.
*H04N 17/00* (2006.01)
*H04N 5/225* (2006.01)
*G02B 7/00* (2021.01)
*H04N 5/235* (2006.01)

(52) U.S. Cl.
CPC ........... *H04N 17/002* (2013.01); *G02B 7/003* (2013.01); *H04N 5/2256* (2013.01); *H04N 5/2351* (2013.01); *H04N 5/2354* (2013.01)

(58) Field of Classification Search
CPC .. H04N 17/002; H04N 5/2256; H04N 5/2351; H04N 5/2354; G02B 7/003
See application file for complete search history.

(56) References Cited

U.S. PATENT DOCUMENTS

2016/0356978 A1* 12/2016 Osborne .............. H04N 17/002
2021/0172879 A1* 6/2021 Chen .................. G01N 21/8806

* cited by examiner

*Primary Examiner* — John W Miller
*Assistant Examiner* — Humam M Satti
(74) *Attorney, Agent, or Firm* — WPAT, PC (57) ABSTRACT

A method for aligning a camera lens with a light source is provided. The method is used in an aligning system. The aligning system includes an alignment element, a reference camera and a fixture. Firstly, the reference camera shoots a reference chart on the alignment element. Then, the light source is placed on the fixture. The light source illuminates the alignment element to generate an illumination result. The reference camera shoots the illumination result. If the illumination result does not comply with a preset specification represented by the reference chart, the fixture adjusts the light source. Then, the camera lens is placed on the fixture. Then, the camera lens shoots the reference chart on the alignment element to acquire a shooting result. If the shooting result does not comply with the preset specification, the fixture adjusts the camera lens.

20 Claims, 6 Drawing Sheets

METHOD FOR ALIGNING CAMERA LENS WITH LIGHT SOURCE

FIELD OF THE INVENTION

The present invention relates to a method for aligning a camera lens with a light source, and more particularly to a method for aligning the illumination area and location of a light source with the shooting area and location of a camera lens in an assembling stage.

BACKGROUND OF THE INVENTION

With the gradual development of the 3D image sensing technology, many mobile electronic devices such as digital cameras, tablet computers, smart phones, smart watches or wearable electronic devices are gradually equipped with 3D image sensing modules as camera lenses and light sources.

Nowadays, the 3D image sensing technologies mainly include a stereo vision technology, a structured light technology, a time of flight (TOF) technology, and the like. Moreover, depending on the applications, one or plural camera lenses or one or plural light sources are configured as a 3D image sensing module according to the design of the 3D image sensing technology. For example, the light source is a light emitting diode (LED), a laser diode (LD) or a vertical cavity surface emitting laser (VCSEL). In addition, the light source emits visible light, infrared light or near-infrared light as the sensing light. In addition, the camera lens is selected according to the type of the light source.

Ideally, the illumination area and location of the light source in the space match the shooting area and location of the camera lens. However, in order to achieve better sensing results, the actual illumination area of the light source is usually slightly larger than the shooting area of the camera lens according to the design. Consequently, the match between the light source and the camera lens on the mobile electronic device or on the circuit board where they are installed should be good enough. If the match between the light source and the camera lens is not good, for example there is a misalignment between the light source and the camera lens, a portion of the shooting area of the camera lens cannot be used. That is, in the subsequent calculating and processing processes, the sensing applications of the pixels at the corresponding location of the camera lens (especially the image sensor in the camera lens) will be sacrificed.

Consequently, in the assembling stage, it is necessary to align the illumination area and location of the light source with the shooting area and location of the camera lens through adjustment and correction. Conventionally, according to an automated optical inspection (AOI) technology, a fixture of a robotic arm and an automatic control system are used to align the assembling location of the light source with the assembling location of the camera lens in the mechanism stop. Particularly, according to the "machine vision" of the gripping result of the robotic arm, the AOI technology is used to detect whether the location of the camera lens or the location of the light source is deviated. If the judging result indicates that the location of the camera lens and the location of the light source are not deviated, the assembling procedure will be performed. However, this method is unable to confirm whether the illumination area and location of the light source and the shooting area and location of the camera lens are aligned with each other.

Alternatively, an adjusting procedure is firstly performed based on the camera lens or the light source. For example, the camera lens is adjusted according to a reference datum plane, and the reference datum plane is used as a datum plane for assembling the light source. Then, the assembling posture of the light source is adjusted according to the luminance uniformity of the light source. However, the adjusting method of using the light source or the camera lens as the reference datum needs so many adjustment steps to complete the alignment. Since it takes a long time to obtain a suitable corresponding relationship, the efficiency of the production line declines.

SUMMARY OF THE INVENTION

The present invention provides a method for aligning a camera lens with a light source. Especially, the aligning method is applied in the assembling stage. Consequently, the illumination area and location of the light source and the shooting area and location of the camera lens match each other. By using the aligning method of the present invention, the alignment error of the mechanism is reduced. Consequently, the image processing time of calculating errors to perform the digital correction will be shortened, and the possibility of sacrificing the pixels of the camera lens to be assembled will be minimized.

In accordance with an aspect of the present invention, a method for aligning a camera lens with a light source. The method is used in an aligning system. The aligning system includes an alignment element, a reference camera and a fixture. The method includes the following steps. Firstly, a first plane, a second plane and a third plane are in parallel with each other. The alignment element is located at the first plane. The reference camera is located at the second plane. The fixture is located at the third plane. The alignment element is arranged between the reference camera and the fixture. Then, the reference camera shoots a reference chart on the alignment element. Then, the light source is placed on the fixture. The light source illuminates the alignment element to generate an illumination result. The reference camera shoots the illumination result. If the illumination result does not comply with a preset specification represented by the reference chart, the fixture adjusts the light source. If the illumination result complies with the preset specification, the camera lens is placed on the fixture. Then, the camera lens shoots the reference chart on the alignment element to acquire a shooting result. If the shooting result does not comply with the preset specification, the fixture adjusts the camera lens.

In accordance with another aspect of the present invention, a method for aligning a camera lens with a light source. The method is used in an aligning system. The aligning system includes an alignment element, a reference camera and a fixture. The method includes the following steps. Firstly, a first plane, a second plane and a third plane are in parallel with each other. The alignment element is located at the first plane. The reference camera is located at the second plane. The fixture is located at the third plane. The alignment element is arranged between the reference camera and the fixture. The reference camera shoots a reference chart on the alignment element. Then, the camera lens is placed on the fixture. Then, the camera lens shoots the reference chart on the alignment element to acquire a shooting result. If the shooting result does not comply with a preset specification represented by the reference chart, the fixture adjusts the camera lens. If the shooting result complies with the preset specification, the light source is placed on the fixture. The light source illuminates the alignment element to generate an illumination result. The reference camera or the camera lens shoots the illumination result. If the illumination result does not comply with the preset specification, the fixture adjusts the light source.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
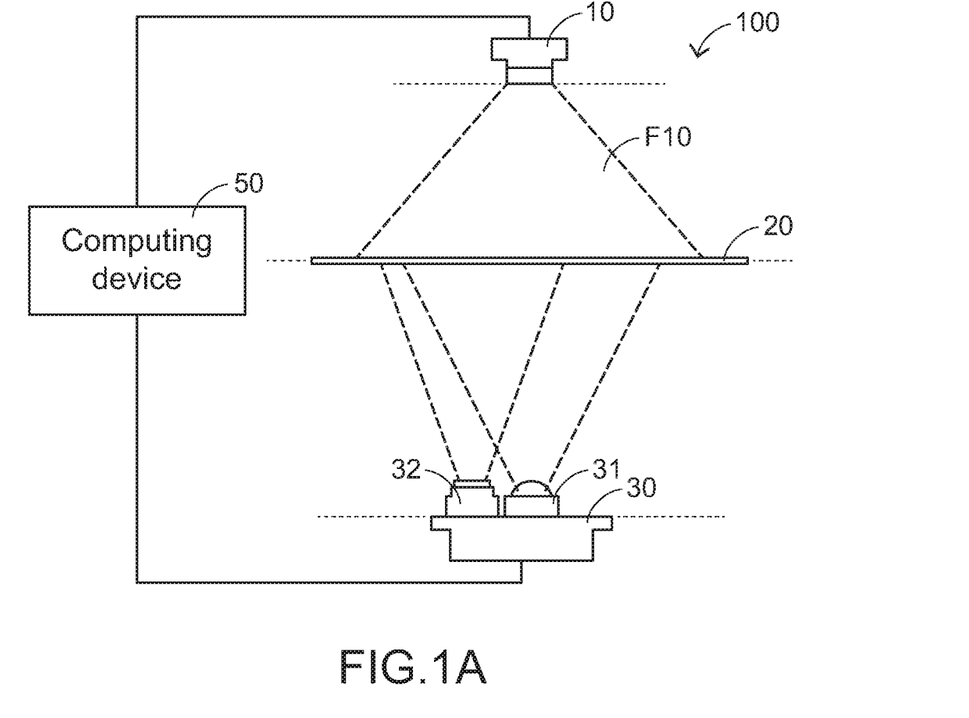
FIG. 1A is a schematic planar view illustrating an aligning system using a method for aligning a camera lens with a light source according to an embodiment of the present invention.

The present invention provides a method for aligning a camera lens with a light source. A first embodiment of the aligning method will be described as follows. FIG. 1A is a schematic planar view illustrating an aligning system using a method for aligning a camera lens with a light source according to an embodiment of the present invention. As shown in FIG. 1A, the aligning system 100 comprises an alignment element 20, a reference camera 10 and a fixture 30. In accordance with a feature of the present invention, the planes where the alignment element 20, the reference camera 10 and the fixture 30 are located are in parallel with each other, and the alignment element 20 is arranged between the reference camera 10 and the fixture 30. That is, the reference camera 10 and the fixture 30 are on two opposite sides of the alignment element 20.

In this context, the reference camera 10 is an external camera that has passed the test and is confirmed to have good performance. Consequently, the reference camera 10 can be applied to the aligning method of the present invention. In addition, the alignment element 20 is light-transmissible and has a smooth surface. In other words, the alignment element 20 is used as a projection screen. When the light beams from a light source illuminate the alignment element 20, the illumination result can be displayed on one surface of the alignment element 20. Moreover, since portions of the light beams are transmitted through the alignment element 20, the illumination content or the image area corresponding to the light beams can be clearly displayed on the opposite surface of the alignment element 20. Moreover, the fixture 30 is a working machine that can be used to perform an alignment test, an adjustment calibration, an assembling operation and any other appropriate operation. The under-test object to undergo the aligning method of the present invention can be placed on the fixture 30. For example, as shown in FIG. 1A, the under-test object includes a camera lens 32 and a light source 31.

Please refer to FIG. 1A again. The aligning system 100 further comprises a computing device 50. The computing device 50 is in communication with the fixture 30 and the reference camera 10. The computing device 50 can receive signals from the fixture 30 and the reference camera 10. For example, the signals contain the shot image signals and the operation status signals generated by the fixture 30 and the reference camera 10. In addition, the computing device 50 is a used as a main controlling and calculating device for implementing the aligning method of the present invention.

Figure 1B:
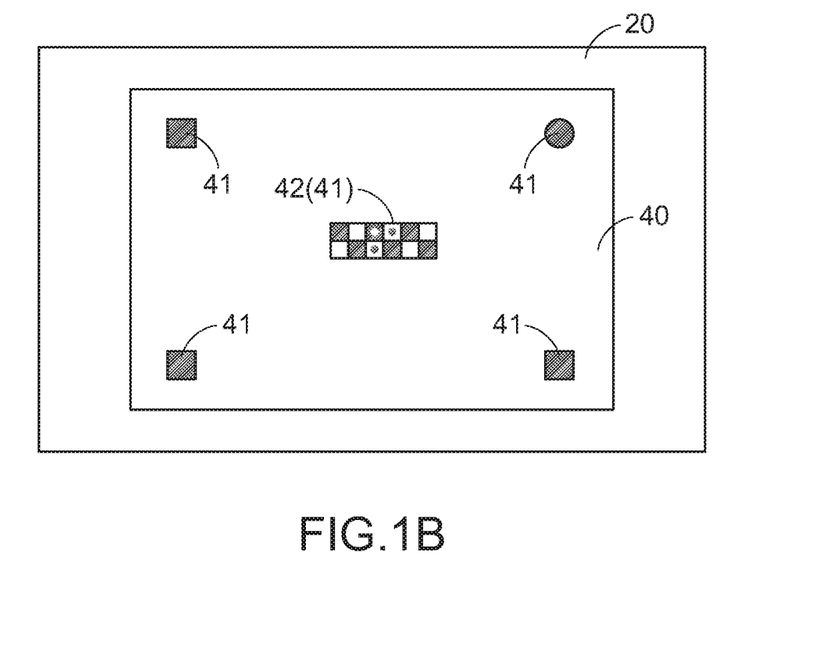
FIG. 1B schematically illustrates the alignment element as shown in FIG. 1A.

FIG. 1B schematically illustrates the alignment element as shown in FIG. 1A. Please refer to FIG. 1B. For performing the aligning method of the present invention, a reference chart 40 is drawn on the surface of the alignment element 20. In this embodiment, the reference chart 40 comprises plural characteristic points 41. These characteristic points 41 are circular or square points. These characteristic points 41 are distributed in a middle region and plural corners of a specified area. In addition, the reference chart 40 further comprises a checkerboard pattern 42, which is formed by some characteristic points 41 collaboratively. The characteristic points 41 of the checkerboard pattern 42 are alternate black and white square points. In addition, some of the characteristic points 41 of the checkerboard pattern 42 contain circular dots with color contrast. The characteristic points 41 of the checkerboard pattern 42 are distributed in the middle region of the specified area.

The reference chart 40 is used as an adjusting and calibrating datum. That is, the reference chart 40 is a reference datum for determining whether the illumination area and location of the light source 31 and the shooting area and location of the camera lens 32 to be assembled with the light source 31 match each other. In this embodiment, the reference camera 10 as the external camera has the higher resolution. As shown in FIG. 1A, a shooting area F10 (or the field of vision) of the reference camera 10 covers a greater portion of the alignment element 20. That is, the shooting area HO is larger than the coverage area of the reference chart 40.

For achieving the better referring efficacy, the installation location of the reference camera 10 is directly aligned with the reference chart 40 on the alignment element 20. Consequently, when the reference camera 10 shoots the reference chart 40 to acquire an image, the reference chart 40 is located at the middle region of the display area of the whole image. Consequently, in the subsequent procedure of assembling the camera lens 32 with the light source 31, the aligning condition can be analyzed more easily and the extent to be adjusted can be judged more precisely.

In FIG. 1A, the camera lens 32 and the light source 31 to be assembled are simultaneously shown. However, the camera lens 32 and the light source 31 are tested sequentially. That is, the camera lens 32 is tested before the light source 31 is tested, or the light source 31 is tested before the camera lens 32 is tested. That is, the object that has not been subjected to the test is not placed on the fixture 30 at this moment. Moreover, since the alignment element 20 has the light-transmissible property, the reference chart 40 can not only be observed by the camera lens 32 but also observed by the reference camera 10.

On the other hand, when the camera lens 32 and the light source 31 to be assembled are installed on the fixture 30, the camera lens 32 and the light source 31 are placed on the corresponding brackets (not shown). That is, a circuit board of an electronic device where the camera lens 32 and the light source 31 are applied has predetermined assembling locations for assembling the camera lens 32 and the light source 31. In this way, the distance between the camera lens 32 and the light source 31 is substantially fixed. In the subsequent adjusting and calibrating procedure, the assembled structure is finely tuned at this location through a three-dimensional tiny distance translation or a tiny angle deflection. After the test is completed, the camera lens 32 and the light source 31 are assembled and fixed on the circuit board. Similarly, the installation location of the fixture 30 in front of the alignment element 20 should be taken into consideration. For example, the camera lens 32 or the light source 31 is directly aligned with the reference chart 40.

Figure 2A:
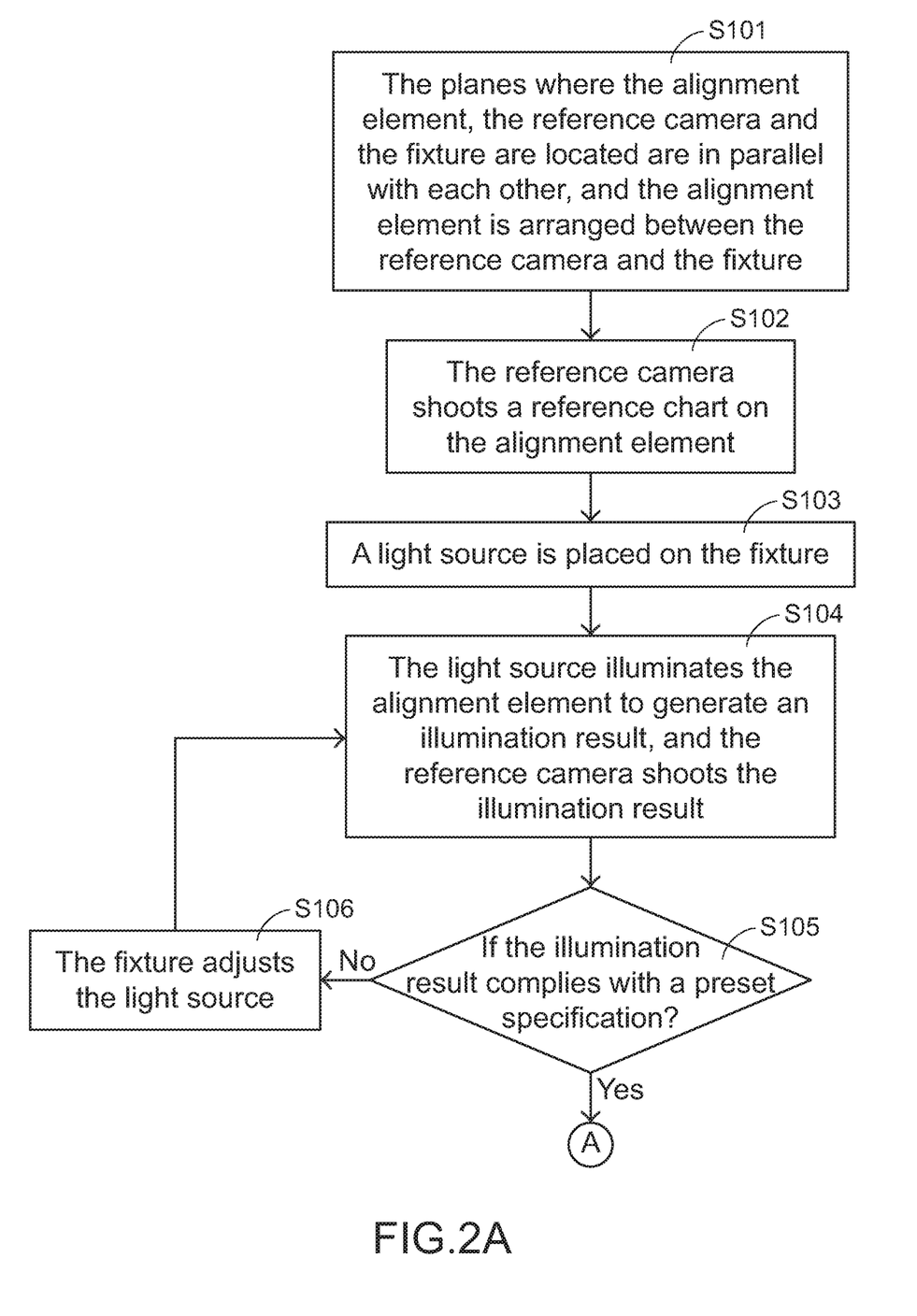
FIG. 2A and FIG. 2B are the flowcharts illustrating a method for aligning a camera lens with a light source according to a first embodiment of the present invention.
Figure 2B:
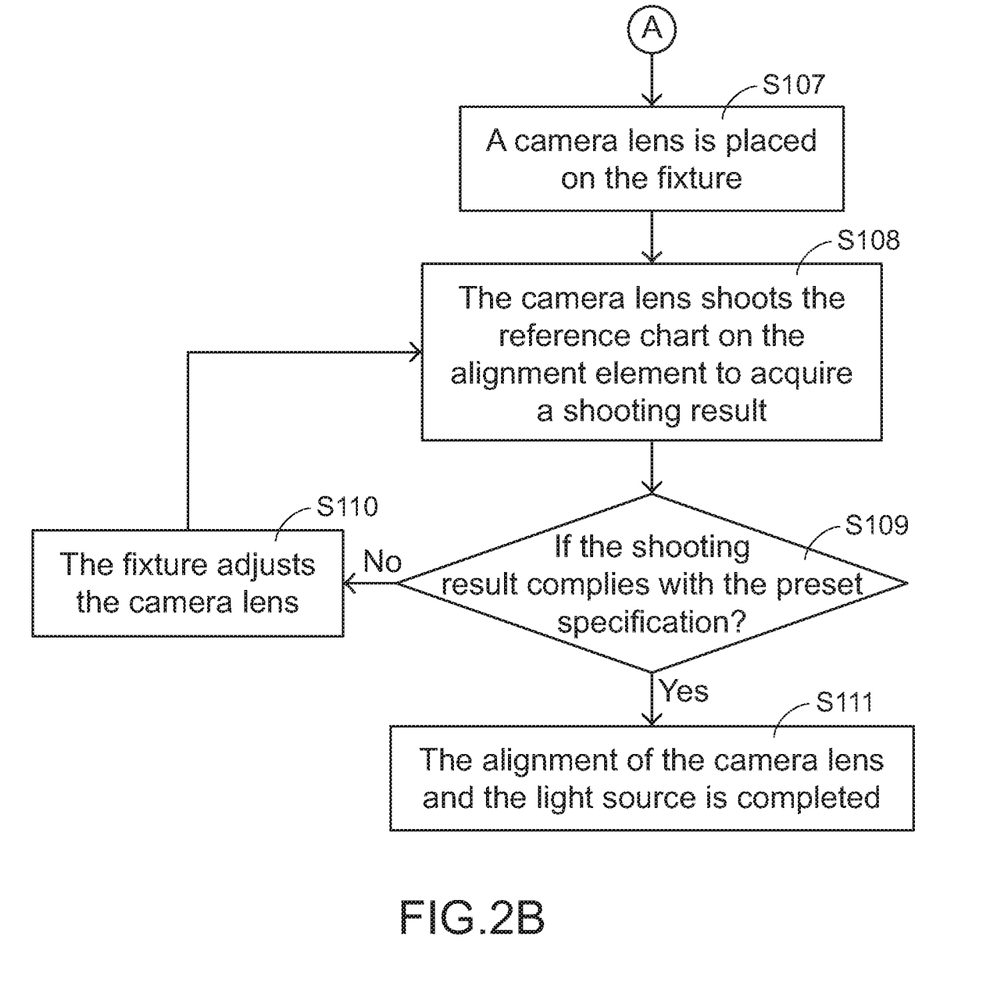

FIG. 2A and FIG. 2B are the flowcharts illustrating a method for aligning a camera lens with a light source according to a first embodiment of the present invention. In this embodiment, the light source 31 is firstly tested, and then the camera lens 32 is tested. The aligning method will be described as follows. Firstly, the planes where the alignment element 20, the reference camera 10 and the fixture 30 are located are in parallel with each other, and the alignment element 20 is arranged between the reference camera 10 and the fixture 30 (Step S101). Then, the reference camera 10 shoots a reference chart 40 on the alignment element 20 (Step S102). Then, a light source 31 is placed on the fixture 30 (Step S103). Then, the light source 31 illuminates the alignment element 20 to generate an illumination result, and the reference camera 10 shoots the illumination result (Step S104). Then, a step S105 is performed to judge whether the illumination result complies with a preset specification represented by the reference chart 40. If the illumination result does not comply with a preset specification represented by the reference chart 40, the fixture 30 adjusts the light source 31 (Step S106). Whereas, if the illumination result complies with the preset specification represented by the reference chart 40, a camera lens 32 is placed on the fixture 30 (Step S107). Then, the camera lens 32 shoots the reference chart 40 on the alignment element 20 to acquire a shooting result (Step S108). Then, a step S109 is performed to judge whether the shooting result complies with the preset specification (Step S109). If the shooting result does not comply with the preset specification, the fixture 30 adjusts the camera lens 32 (Step S110). Whereas, if the shooting result complies with the preset specification, the alignment of the camera lens 32 and the light source 31 is completed (Step S111).

As mentioned above in the step S101, the planes where the alignment element 20, the reference camera 10 and the fixture 30 are located are in parallel with each other. After these three planes are in parallel with each other, it is preferred that the variables of processing the aligning condition or the tilt condition are all attributed to the control mechanism of the fixture 30 in the subsequent procedure of assembling the camera lens 32 and the light source 31. That is, the possible factors influencing the adjustment and calibration of the fixture 30 have to be excluded. In other words, the step S101 needs to be completed before the actual test procedure is started.

Moreover, the three planes can be adjusted to be in parallel with each other through many methods. For example, after the alignment element 20 is arranged between the reference camera 10 and the fixture 30, a level gauge is used to adjust the alignment element 20, the reference camera 10 and the fixture 30. Consequently, the planes where the alignment element 20, the reference camera 10 and the fixture 30 are located are in parallel with each other. In accordance with the existing technologies, the well-known laser level gauge can emit laser beams to judge whether the illuminated surface is in the perpendicular state. Consequently, the laser level gauge can further judge whether the laser level gauge and the illuminated surface are in parallel with each other.

Alternatively, after the alignment element 20 is arranged between the reference camera 10 and the fixture 30, the reference chart 40 on the alignment element 20 is shot from the location of the reference camera 10, and the reference chart 40 on the alignment element 20 is shot from the location of the fixture 30. Consequently, a first tilt extent and a second tilt extent are obtained. According to the first tilt extent and the second tilt extent, the reference camera 10 and the fixture 30 are adjusted. Consequently, the planes where the alignment element 20, the reference camera 10 and the fixture 30 are located are in parallel with each other. In an embodiment, a standard camera is sequentially placed on the planes of the reference camera 10 and the fixture 30 to shoot the reference chart 40. For example, the reference camera 10 can be used as the standard camera. If the characteristic points 41 of the reference chart 40 are not square points or circular points, it means that there is a tilt between the two planes. Whereas, if the characteristic points 41 of the reference chart 40 are square points or circular points, it means that the two planes are in parallel with each other. The above method of judging the tilt extent can be implemented by the computing device 50. In addition, the computing device 50 provides the instruction for adjusting the reference camera 10 and the fixture 30.

In the steps S102, S103 and S104, the reference camera 10 shoots the reference chart 40 in order to set a reference standard for comparison in the subsequent procedure, and the computing device 50 is capable of recording, processing and analyzing the image of the reference chart 40 that is acquired by the reference camera 10 and defining the corresponding coordinate locations of the characteristic points 41 on the alignment element 20. Since the light source 31 is tested firstly, only the light source 31 is placed on the fixture 30 in this stage. In addition, the reference camera 10 shoots the illumination result that is generated by the light source 31 and transmits the illumination result to the computing device 50. The computing device 50 can search the location of the light source 31 with the highest luminance to realize the distribution of the light beams from the light source 31. In addition, the computing device 50 defines the coordinate location of the illumination result on the alignment element 20. Consequently, the computing device 50 can compare the acquired image of the reference chart 40 with the illumination result.

The detailed contents about the steps S105 and S106 will be illustrated as follows. As mentioned above, the preset specification is a required condition that the camera lens 32 and the light source 31 to be assembled match each other in the application status. Consequently, the reference chart 40 needs to be drawn on the alignment element 20 according to the required condition. Moreover, since the illumination area and location of the light source 31 and the shooting area and location of the camera lens 32 are related to the distance between the light source 31 (or the camera lens 32) and the alignment element 20, the distance between the alignment element 20 and the reference camera 10 and the distance between the alignment element 20 and the fixture 30 should be taken into consideration when the reference chart 40 is designed.

In an embodiment, the content of the preset specification contains a preset area, a preset location, a preset shape and a preset size. If the coverage area of the illumination result does not match the preset area (i.e., the coverage area of the reference chart 40), it means that the illumination result does not comply with the preset specification. Alternatively, if the shape of the structured light pattern of the illumination result or area is deflected or tilted, it also means that the illumination result does not comply with the preset specification. In addition, the result of comparing the location and distribution size of the illumination result with the location and size of the preset specification can be used to judge whether there is a deviation.

Figure 3A:
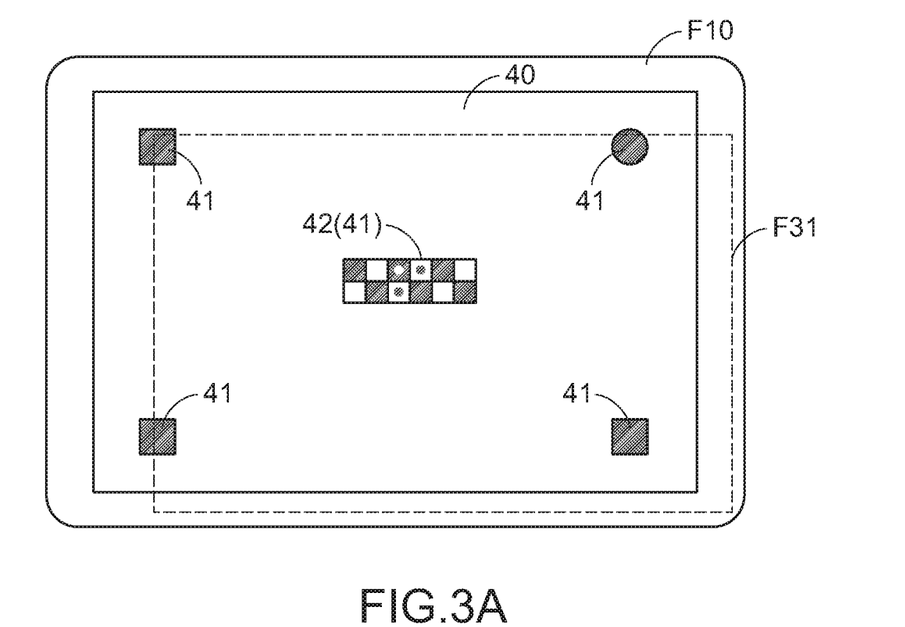
FIG. 3A illustrates the comparison between an illumination result F31 and a reference chart in a test stage.

FIG. 3A illustrates the comparison between an illumination result F31 and a reference chart in a test stage. As shown in FIG. 3A, the coverage area of the illumination result F31 does not match the coverage area of the reference chart 40. Consequently, it is judged that the illumination result F31 does not comply with the preset specification. It is noted that the actual scenario is not restricted. For example, if the coverage area of an illumination result completely matches the coverage area of the reference chart 40 but the shape is tilted or the displayed location is deviated, it is also judged that the illumination result does not comply with the preset specification. If the illumination result complies with the preset specification, the subsequent procedure can be performed. Whereas, if the illumination result does not comply with the preset specification, the adjusting procedure of the step S106 will be performed.

The image content as shown in FIG. 3A represents the shooting area F10 that is observed by the reference camera 10 and also represents the image to be analyzed by the computing device 50. Consequently, the step S106 comprises the following sub-steps. Firstly, the computing device 50 analyzes the difference between the illumination result and the preset specification and generates a light source adjustment strategy according to the difference between the illumination result and the preset specification. Then, the computing device 50 sends the light source adjustment strategy to the fixture 30, and the fixture 30 adjusts the light source 31 according to the light source adjustment strategy. For example, the light source 31 is subjected to the three-dimensional translation or deflection in the adjusting procedure. That is, the translation direction, the translation amount, the deflection direction or the deflection amount of the light source 31 is adjusted. Consequently, the coverage area of the illumination result F31 and the coverage area of the reference chart 40 as shown in FIG. 3A are overlapped with each other, or the center of the illumination result F31 and the center of the reference chart 40 are aligned with each other. In practice, the adjustment of the light source 31 cannot be completed in a single step. In other words, after the step S106 is performed, the steps S104 and S105 are repeatedly done to judge the status of the light source 31 until the match and the alignment between the light source 31 and the reference chart 40 are completed.

Generally, regardless of whether a surface light source or a point light source illuminates an object, the illumination shape, the illumination area or the illumination location needs to comply with a specified standard. Consequently, in the step S106, the computing device 50 performs the following computing and analyzing procedures. Firstly, the illumination result is processed through a morphology, and the features in the illumination result are extracted. Consequently, a center coordinate of the illumination result is obtained. Then, the center coordinate of the illumination result is projected to the center coordinate of the circular characteristic point 41 that is shot by the reference camera 10. Consequently, a spatial transformation matrix is obtained. After a corresponding rotation matrix is solved, posture adjustment parameters are obtained.

In another embodiment, after the test of the light source 31 is completed (i.e., in the stage between the step S105 and the step S107), the aligning method further comprises a step. That is, if the illumination result complies with the preset specification, the light source 31 is then fixed on a printed circuit board (not shown). Consequently, the procedure of aligning and assembling the light source 31 is completed.

The detailed contents about the steps S107 and S108 will be illustrated as follows. In this stage, the adjusted light source 31 and the under-test camera lens 32 are placed on the fixture 30. Moreover, the camera lens 32 has the shooting function. That is, the camera lens 32 shoots the reference chart 40 to acquire the shooting result. After the shooting result is analyzed, the camera lens 32 can realize whether the distribution of the shooting result is at the required location. Moreover, since the coordinate location of the reference chart 40 has been recorded in the computing device 50, the reference camera 10 does not need to shoot the reference chart 40 in this stage. In this stage, the shooting result can be transmitted from the fixture 30 to the computing device 50. The computing device 50 can realize the distribution area of the shooting result through image analysis. For example, after the coordinate location of the reference chart 40 on the alignment element 20 is transformed into the coordinate location in the shooting result, the coordinate location of the shooting result on the alignment element 20 can be defined.

The detailed contents about the steps S109 and S110 will be illustrated as follows. Similarly, the content of the preset specification represented by the reference chart 40 contains the preset area, the preset location, the preset shape and the preset size. If the coverage area of the shooting result does not match the coverage area of the reference chart 40, it means that the shooting result does not comply with the preset specification. Alternatively, if the shape of the reference chart 40 observed in the shooting result is deflected or tilted, it also means that the shooting result does not comply with the preset specification.

Figure 3B:
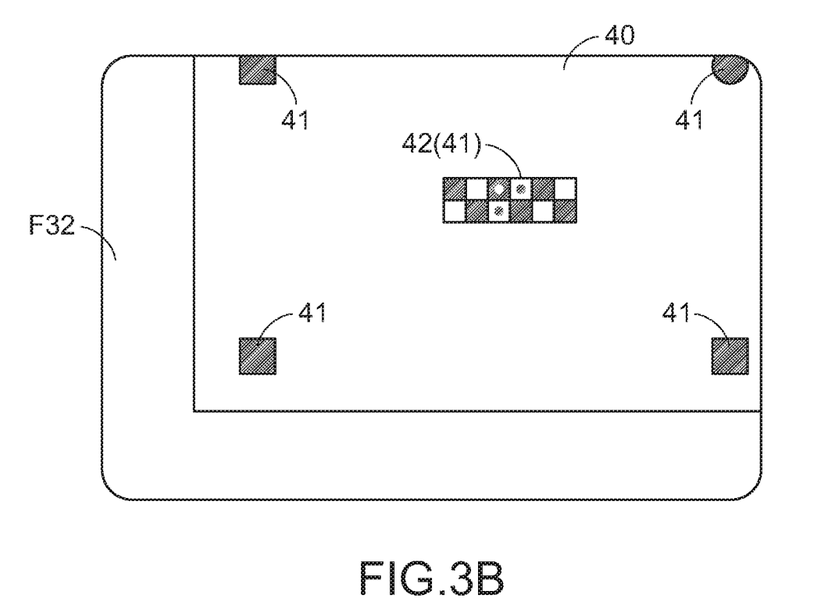
FIG. 3B illustrates the comparison between a shooting result F32 and a reference chart in a test stage.

FIG. 3B illustrates the comparison between a shooting result F32 and a reference chart in a test stage. In this stage, the object of judging the shooting result F32 is to analyze the reference chart 40 in the shooting result F32. For example, this stage analyzes whether the characteristic points 41 of the reference chart 40 are at the designated locations, or this stage analyzes whether the shapes of these characteristic points 41 are in a horizontal state or a tilted state. For example, as shown in FIG. 3B, the coverage area of the shooting result F32 does not match the coverage area of the reference chart 40. That is, the locations of the characteristic points 41 are erroneous. Consequently, it is judged that the shooting result F32 does not comply with the preset specification. Whereas, if the shooting result complies with the preset specification, the alignment of the camera lens 32 and the light source 31 is completed (Step S111), or other procedures can be performed. If the shooting result does not comply with the preset specification, it is necessary to perform the adjusting procedure of the step S110. The image content as shown in FIG. 3B represents the shooting result F32 that is observed by the camera lens 32 and also represents the image to be analyzed by the computing device 50. Consequently, the step S110 comprises the following sub-steps. Firstly, the computing device 50 analyzes the difference between the shooting result and the preset specification and generates a camera lens adjustment strategy according to the difference between the shooting result and the preset specification. Then, the computing device 50 sends the camera lens adjustment strategy to the fixture 30, and the fixture 30 adjusts the camera lens 32 according to the camera lens adjustment strategy. For example, the camera lens 32 is subjected to the three-dimensional translation or deflection in the adjusting procedure. That is, the translation direction, the translation amount, the deflection direction or the deflection amount of the camera lens 32 is adjusted. Consequently, the coverage area of the shooting result F32 and the coverage area of the reference chart 40 as shown in FIG. 3B are overlapped with each other, or the center of the shooting result F32 and the center of the reference chart 40 are aligned with each other. Similarly, the adjustment of the camera lens 32 cannot be completed in a single step. In other words, after the step S110 is performed, the steps S108 and S109 are repeatedly done to judge the status of the camera lens 32 until the match and the alignment between the camera lens 32 and the reference chart 40 are completed.

For example, in the step S110, the computing device 50 performs the following computation. For the square characteristic point 41, the point coordinates (u, v) of the four corners of the square characteristic point 41 shot by the reference camera 10 or the camera lens 32 are normalized to the point coordinates (x, y) of an ideal square. After the shot point coordinates are projected to the point coordinates of the square, a spatial transformation matrix is obtained. The relationships between the point coordinates and the spatial transformation matrix can be expressed by the following mathematic formula:

$$[u \ v \ 1] = [x \ y \ 1] \times \begin{bmatrix} A & D & 0 \\ B & E & 0 \\ C & F & 1 \end{bmatrix}$$

where, $U$ is $[u \ v \ 1]$, $X$ is $[x \ y \ 1]$, and $T$ is $\begin{bmatrix} A & D & 0 \\ B & E & 0 \\ C & F & 1 \end{bmatrix}$.

That is, $U = X \times T$. Consequently, $T = X^{-1} \times U$, wherein T is the spatial transformation matrix. After the spatial transformation matrix T is transposed, a homography matrix between the coordinate points of the shot image and the ideal square is obtained. Afterwards, the cross product of the arguments of the matrix are solved, and thus a rotation matrix is obtained. The posture adjustment parameters are obtained according to the rotation matrix. In the above embodiment, the point coordinates of the four corners of the square characteristic point 41 are normalized. Alternatively, the spatial transformation matrix can also be obtained according to the center of the circular characteristic point 41.

In another embodiment, after the test of the camera lens 32 is completed (i.e., in the stage between the step S109 and the step S111), the aligning method further comprises a step. That is, if the shooting result complies with the preset specification, the camera lens 32 is then fixed on a printed circuit board (not shown). Consequently, the procedure of aligning and assembling the camera lens 32 is completed.

After the alignment between the light source 31 and the reference chart 40 is completed and the alignment between the camera lens 32 and the reference chart 40 is completed, it means that the alignment between the light source 31 and the camera lens 32 is completed.

In the first embodiment, the setting of the preset specification is referred to the installation of one light source and one camera lens. Consequently, if the coverage area of the illumination result (or the shooting result) and the coverage area of the reference chart 40 are overlapped or covered with each other or the center of the illumination result (or the shooting result) and the center of the reference chart 40 are aligned with each other, it is judged that the illumination result (or the shooting result) complies with the preset specification. However, in case that the aligning system comprises more than one light source or more than one camera lens, the setting of the preset specification can be changed. For example, in an embodiment, the aligning system comprises two camera lenses. If the shooting area of each camera lens covers a half of the coverage area of the reference chart 40, it is judged that the shooting results of the two camera lenses comply with the preset specification. Then, an image processing technology is used to combine and stitch the shooting results of the two camera lenses.

In the first embodiment, the description is referred to the installation of one light source and one camera lens. It is noted that the examples of the present invention are not restricted. According to the 3D image sensing applications, the aligning method of the present invention can be applied to assemble plural light sources or plural camera lenses. Consequently, numerous modifications and alterations may be made while retaining the teachings of the first embodiment of the present invention.

For example, in another embodiment, an additional light source needs to be assembled. If the judging result of the step S105 in the flowchart of FIG. 2A indicates that the illumination result complies with the preset specification, the following steps will be performed. Firstly, the additional light source is placed on the fixture 30. Then, the additional light source illuminates the alignment element 20 to generate an additional illumination result, and the reference camera 10 shoots the additional illumination result. If the additional illumination result does not comply with the preset specification, the fixture 30 adjusts the additional light source. In other words, the steps S103~S106 are repeatedly done.

Alternatively, an additional camera lens needs to be assembled. If the judging result of the step S109 in the flowchart of FIG. 2B indicates that the shooting result complies with the preset specification, the following steps will be performed. Firstly, the additional camera lens is placed on the fixture 30. Then, the additional camera lens shoots the reference chart 40 on the alignment element 20 to acquire an additional shooting result. If the additional shooting result does not comply with the preset specification, the fixture 30 adjusts the additional camera lens. That is, the steps S107~S110 are repeatedly done.

On the other hand, the step S109 of judging whether the shooting result complies with the preset specification is to analyze the reference chart 40 in the shooting result. However, the method of judging whether the shooting result complies with the preset specification is not restricted. For example, since the light source 31 has been adjusted in this stage (i.e., the step S105), the illumination result that is generated by the illumination of the light source 31 complies with the preset specification at this moment. That is, the coverage area of the illumination result matches the coverage area of the reference chart 40, and the shape of the illumination result is not in the tilted state (or the horizontal state). Consequently, when the light source 31 is enabled, the generated illumination result can be used as the judging standard.

Alternatively, the step S109 of judging whether the shooting result complies with the preset specification is to analyze the illumination result in the shooting result. That is, the coverage area of the illumination result is regarded as the coverage area of the reference chart 40. Consequently, if the coverage area of the shooting result does not match the coverage area of the illumination result, it means that the shooting result does not comply with the preset specification. Alternatively, if the structured light pattern of the illumination result observed in the shooting result is deflected or tilted, it also means that the shooting result does not comply with the preset specification. In the adjusting procedure, the camera lens 32 is subjected to the three-dimensional translation or deflection. Consequently, the coverage area of the shooting result and the coverage area of the illumination result are overlapped with each other, or the center of the shooting result and the center of the illumination result are aligned with each other.

The present invention provides a method for aligning a camera lens with a light source. A second embodiment of the aligning method will be described as follows. The aligning system 100 of the first embodiment as shown in FIG. 1A and the reference chart 40 of the first embodiment as shown in FIG. 1B can be used in the second embodiment. In comparison with the first embodiment, the aligning method of the second embodiment firstly tests the camera lens 32 and then tests the light source 31.

Figure 4A:
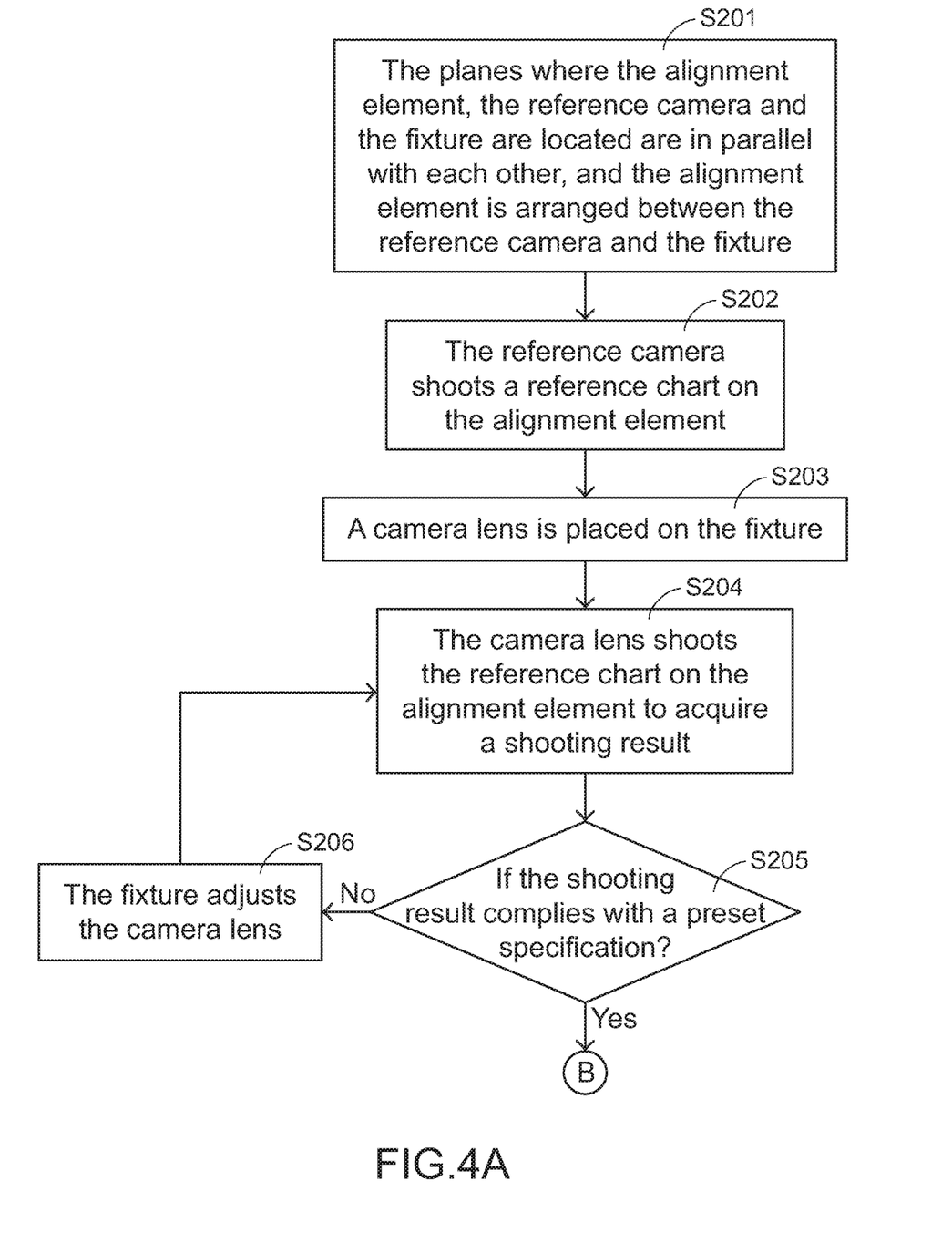
FIG. 4A and FIG. 4B are the flowcharts illustrating a method for aligning a camera lens with a light source according to a second embodiment of the present invention.
Figure 4B:
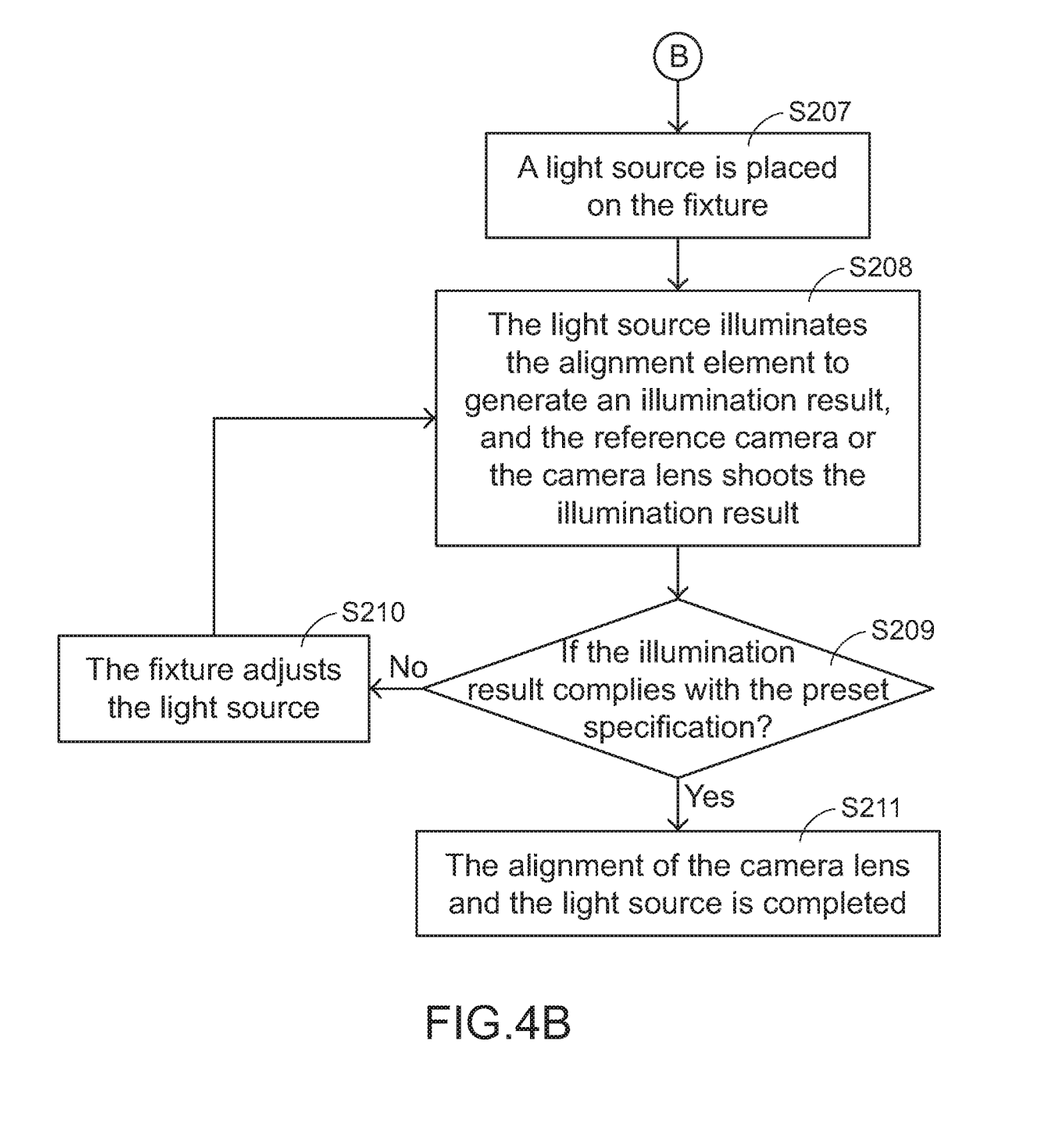

FIG. 4A and FIG. 4B are the flowcharts illustrating a method for aligning a camera lens with a light source according to a second embodiment of the present invention. Firstly, the planes where the alignment element 20, the reference camera 10 and the fixture 30 are located are in parallel with each other, and the alignment element 20 is arranged between the reference camera 10 and the fixture 30 (Step S201). Then, the reference camera 10 shoots a reference chart 40 on the alignment element 20 (Step S202). Then, a camera lens 32 is placed on the fixture 30 (Step S203). Then, the camera lens 32 shoots the reference chart 40 on the alignment element 20 to acquire a shooting result (Step S204). Then, a step S205 is performed to judge whether the shooting result complies with a preset specification represented by the reference chart 40 (Step S205). If the shooting result does not comply with the preset specification, the fixture 30 adjusts the camera lens 32 (Step S206). Whereas, if the shooting result complies with the preset specification, a light source 31 is placed on the fixture 30 (Step S207). Then, the light source 31 illuminates the alignment element 20 to generate an illumination result, and the reference camera 10 or the camera lens 32 shoots the illumination result (Step S208). Then, a step S209 is performed to judge whether the illumination result complies with the preset specification. If the illumination result does not comply with the preset specification, the fixture 30 adjusts the light source 31 (Step S210). Whereas, if the illumination result complies with the preset specification, the alignment of the camera lens 32 and the light source 31 is completed (Step S211).

The detailed content of the step S201 of the second embodiment is similar to that of the step S101 of the first embodiment.

In the steps S202, S203 and S204, the computing device 50 sets a reference standard through the reference camera 10. That is, the computing device 50 acquires the preset specification represented by the reference chart 40 and records the coordinate locations of the reference chart 40. Since the camera lens 32 is tested firstly, only the camera lens 32 is placed on the fixture 30 in this stage. Similarly, after the camera lens 32 shoots the reference chart 40 to acquire the shooting result, the shooting result that are obtained can be transmitted from the fixture 30 to the computing device 50. The computing device 50 can define the coordinate location of the shooting result on the alignment element 20 through image analysis.

The detailed contents about the steps S205 and S206 will be illustrated as follows. Similarly, in this stage, the object of judging the shooting result is to analyze the reference chart 40 in the shooting result. If the shooting result complies with the preset specification, the subsequent procedure can be performed. Whereas, if the shooting result does not comply with the preset specification, it is necessary to perform the adjusting procedure of the step S206. The descriptions of the difference analysis and the adjusting procedure are similar to the steps S109 and S110 of the first embodiment. Moreover, after the camera lens 32 is tested, the camera lens 32 can be fixed.

The detailed contents about the steps S207 and S208 are similar to those of the steps S103 and S104 of the first embodiment. The reference camera 10 shoots the illumination result and transmits the illumination result to the computing device 50. In addition, the computing device 50 can define the coordinate location of the illumination result on the alignment element 20. In this stage, the under-test light source 31 and the adjusted camera lens 32 are placed on the fixture 30. That is, the shooting result of the camera lens 32 complies with the preset specification at this moment. Consequently, the camera lens 32 is also suitably used to shoot the illumination result. Regardless of whether the reference camera 10 or the camera lens 32 is used, the reference chart 40 in the shot image is at the designated location. The comparison between distribution of the illumination result displayed on the image and the reference chart 40 can be also referred to FIG. 3A.

The detailed contents about the steps S209 and S210 will be illustrated as follows. In this stage, the illumination result to be judged may come from the reference camera 10 or the camera lens 32. In the step S209, only one of the reference camera 10 and the camera lens 32 is used to acquire the illumination result for judgment. If the illumination result complies with the preset specification, the alignment of the camera lens 32 and the light source 31 is completed (Step S211), or other procedures can be performed. Whereas, if the illumination result does not comply with the preset specification, the adjusting procedure of the step S210 will be performed. The descriptions of the difference analysis and the adjusting procedure are similar to the steps S105 and S106 of the first embodiment. Moreover, after the light source 31 is tested, the light source 31 can be fixed. Meanwhile, the match and the alignment between the camera lens 32 and the light source 31 are completed.

In the second embodiment, the description is referred to the installation of one light source and one camera lens. It is noted that the examples of the present invention are not restricted. Moreover, the aligning method of the present invention can be applied to assemble plural light sources or plural camera lenses. Consequently, numerous modifications and alterations may be made while retaining the teachings of the second embodiment of the present invention.

For example, in another embodiment, an additional camera lens needs to be assembled. If the judging result of the step S205 in the flowchart of FIG. 4A indicates that the shooting result complies with the preset specification, the following steps will be performed. Firstly, the additional camera lens is placed on the fixture 30. Then, the additional camera lens shoots the reference chart 40 on the alignment element 20 to acquire an additional shooting result. If the additional shooting result does not comply with the preset specification, the fixture 30 adjusts the additional camera lens. That is, the steps S203~S206 are repeatedly done.

Alternatively, an additional light source needs to be assembled. If the judging result of the step S209 in the flowchart of FIG. 4B indicates that the illumination result complies with the preset specification, the following steps will be performed. Firstly, the additional light source is placed on the fixture 30. Then, the additional light source illuminates the alignment element 20 to generate an additional illumination result, and the reference camera 10 or the camera lens 32 shoots the additional illumination result. If the additional illumination result does not comply with the preset specification, the fixture 30 adjusts the additional light source. In other words, the steps S207~S210 are repeatedly done.

From the above descriptions, the present invention provides a method for aligning a camera lens with a light source. When compared with the conventional technologies, the aligning method of the present invention has the following advantages. Firstly, an external reference camera with the higher resolution is used as the shooting tool and the standard in the aligning procedure. Consequently, the accuracy of the image analysis in the subsequent procedure is effectively increased. Secondly, the alignment test result of the camera lens or the light source can be directly compared with the reference chart. Consequently, the computing device can quickly realize whether the shooting result or the illumination result complies with the preset specification. In addition, the computing device can accurately provide the adjusting and correcting strategy such as translation or deflection. Consequently, the match and the alignment between the camera lens and the light source can be effectively completed. Thirdly, since the alignment accuracy is increased, the alignment error of the mechanism is reduced. Consequently, the image processing time of calculating errors to perform the digital correction will be shortened, and the possibility of sacrificing the pixels of the camera lens to be assembled will be minimized.

Consequently, the aligning method of the present invention is capable of effectively overcoming the drawbacks of the conventional technologies and achieving the purposes of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A method for aligning a camera lens with a light source, the method being used in an aligning system, the aligning system comprising an alignment element, a reference camera and a fixture, the method comprising steps of:
    allowing a first plane, a second plane and a third plane to be in parallel with each other, wherein the alignment element is located at the first plane, the reference camera is located at the second plane, the fixture is located at the third plane, and the alignment element is arranged between the reference camera and the fixture;
    the reference camera shooting a reference chart on the alignment element;
    placing the light source on the fixture;
    the light source illuminating the alignment element to generate an illumination result;
    the reference camera shooting the illumination result;
    if the illumination result does not comply with a preset specification represented by the reference chart, the fixture adjusting the light source;
    if the illumination result complies with the preset specification, placing the camera lens on the fixture;
    the camera lens shooting the reference chart on the alignment element to acquire a shooting result; and
    if the shooting result does not comply with the preset specification, the fixture adjusting the camera lens.

2. The method according to claim 1, wherein the alignment element is light-transmissible.

3. The method according to claim 1, wherein the reference chart comprises plural characteristic points, and the preset specification contains a preset area, a preset location, a preset shape and a preset size.

4. The method according to claim 1, further comprising steps of:
    installing the alignment element, the reference camera and the fixture; and
    using a level gauge to adjust the alignment element, the reference camera and the fixture, so that the first plane, the second plane and the third plane are in parallel with each other.

5. The method according to claim 1, further comprising steps of:
    installing the alignment element, the reference camera and the fixture;
    shooting the reference chart on the alignment element from a location of the reference camera to obtain a first tilt extent, and shooting the reference chart on the alignment element from a location of the fixture to obtain a second tilt extent; and
    adjusting the reference camera and the fixture according to the first tilt extent and the second tilt extent, so that the first plane, the second plane and the third plane are in parallel with each other.

6. The method according to claim 1, further comprising steps of:
    placing an additional light source on the fixture;
    the additional light source illuminating the alignment element to generate an additional illumination result;
    the reference camera shooting the additional illumination result; and
    if the additional illumination result does not comply with the preset specification, the fixture adjusting the additional light source.

7. The method according to claim 1, further comprising steps of:
    placing an additional camera lens on the fixture;
    the additional camera lens shooting the reference chart on the alignment element to acquire an additional shooting result; and
    if the additional shooting result does not comply with the preset specification, the fixture adjusting the additional camera lens.

8. The method according to claim 1, further comprising steps of:
    if the illumination result complies with the preset specification, fixing the light source on a printed circuit board; and if the shooting result complies with the preset specification, fixing the camera lens on the printed circuit board.

9. The method according to claim 1, further comprising steps of:
analyzing a difference between the illumination result and the preset specification, and generating a light source adjustment strategy according to the difference between the illumination result and the preset specification; and
the fixture adjusting the light source according to the light source adjustment strategy.

10. The method according to claim 1, further comprising steps of:
analyzing a difference between the shooting result and the preset specification, and generating a camera lens adjustment strategy according to the difference between the shooting result and the preset specification; and
the fixture adjusting the camera lens according to the camera lens adjustment strategy.

11. A method for aligning a camera lens with a light source, the method being used in an aligning system, the aligning system comprising an alignment element, a reference camera and a fixture, the method comprising steps of:
allowing a first plane, a second plane and a third plane to be in parallel with each other, wherein the alignment element is located at the first plane, the reference camera is located at the second plane, the fixture is located at the third plane, and the alignment element is arranged between the reference camera and the fixture;
the reference camera shooting a reference chart on the alignment element;
placing the camera lens on the fixture;
the camera lens shooting the reference chart on the alignment element to acquire a shooting result;
if the shooting result does not comply with a preset specification represented by the reference chart, the fixture adjusting the camera lens;
if the shooting result complies with the preset specification, placing the light source on the fixture;
the light source illuminating the alignment element to generate an illumination result;
the reference camera or the camera lens shooting the illumination result; and
if the illumination result does not comply with the preset specification, the fixture adjusting the light source.

12. The method according to claim 11, wherein the alignment element is light-transmissible.

13. The method according to claim 11, wherein the reference chart comprises plural characteristic points, and the preset specification contains a preset area, a preset location, a preset shape and a preset size.

14. The method according to claim 11, further comprising steps of:
installing the alignment element, the reference camera and the fixture; and
using a level gauge to adjust the alignment element, the reference camera and the fixture, so that the first plane, the second plane and the third plane are in parallel with each other.

15. The method according to claim 11, further comprising steps of:
installing the alignment element, the reference camera and the fixture;
shooting the reference chart on the alignment element from a location of the reference camera to obtain a first tilt extent, and shooting the reference chart on the alignment element from a location of the fixture to obtain a second tilt extent; and
adjusting the reference camera and the fixture according to the first tilt extent and the second tilt extent, so that the first plane, the second plane and the third plane are in parallel with each other.

16. The method according to claim 11, further comprising steps of:
placing an additional camera lens on the fixture;
the additional camera lens shooting the reference chart on the alignment element to acquire an additional shooting result; and
if the additional shooting result does not comply with the preset specification, the fixture adjusting the additional camera lens.

17. The method according to claim 11, further comprising steps of:
placing an additional light source on the fixture;
the additional light source illuminating the alignment element to generate an additional illumination result;
the reference camera or the camera lens shooting the additional illumination result; and
if the additional illumination result does not comply with the preset specification, the fixture adjusting the additional light source.

18. The method according to claim 11, further comprising steps of:
if the illumination result complies with the preset specification, fixing the light source on a printed circuit board; and
if the shooting result complies with the preset specification, fixing the camera lens on the printed circuit board.

19. The method according to claim 11, further comprising steps of:
analyzing a difference between the shooting result and the preset specification, and generating a camera lens adjustment strategy according to the difference between the shooting result and the preset specification; and
the fixture adjusting the camera lens according to the camera lens adjustment strategy.

20. The method according to claim 11, further comprising steps of:
analyzing a difference between the illumination result and the preset specification, and generating a light source adjustment strategy according to the difference between the illumination result and the preset specification; and
the fixture adjusting the light source according to the light source adjustment strategy.

* * * * *